United States Patent [19]

Primavera et al.

[11] Patent Number: 4,883,588
[45] Date of Patent: Nov. 28, 1989

[54] UNDERWATER FILTER SYSTEM

[75] Inventors: Stephen W. Primavera, North Attleboro; John J. Burbank, Jr., Marlboro; Garrett J. Neault, Carver, all of Mass.

[73] Assignee: Vacco Industries, South El Monte, Calif.

[21] Appl. No.: 55,536

[22] Filed: May 29, 1987

[51] Int. Cl.⁴ .............................................. B01D 27/08
[52] U.S. Cl. .................................... 210/117; 210/238; 81/176.15
[58] Field of Search ............... 210/232, 117, 237, 238, 210/323.2; 81/176.1, 176.15, 459

[56] References Cited

U.S. PATENT DOCUMENTS

| | | | |
|---|---|---|---|
| 1,467,936 | 9/1923 | Janssen | 81/176.15 |
| 2,461,680 | 7/1945 | Cousino | 81/459 |
| 2,525,222 | 10/1950 | Holt | 81/176.15 |
| 2,940,643 | 6/1960 | Olson | 81/176.1 |
| 2,956,461 | 10/1960 | Anderson | 81/71 |
| 3,066,559 | 12/1962 | Harvel et al. | 81/53 |
| 3,595,397 | 7/1971 | Abos | 210/232 |
| 3,615,016 | 10/1971 | Soriente et al. | 210/232 |
| 3,890,233 | 6/1975 | Gischel | 210/237 |
| 4,059,033 | 11/1977 | Johnson | 81/176.1 |
| 4,096,032 | 6/1978 | Mayers et al. | 176/38 |
| 4,224,160 | 9/1980 | Wendland | 210/236 |
| 4,272,368 | 6/1981 | Foord et al. | 210/232 |
| 4,556,486 | 12/1985 | Merket | 210/170 |
| 4,610,838 | 9/1986 | Gasparro et al. | 376/248 |

Primary Examiner—Benoit Castel
Attorney, Agent, or Firm—Frederick E. Mueller

[57] ABSTRACT

Radwaste contaminated effluent generated by an underwater source is filtered by a submersible filter system employing cannister shielded filter cartridges. The system has a submersible frame that fixedly mounts a coupling for each filter cannister. Each cannister is internally fitted with a filter cartridge and mounting means configured to divide the cannister to an inlet chamber and a filtrate chamber, the latter having outlet ports for exhausting the filtrate to the pool in which the system is submerged. The inlet chamber is in check valved fluid communication with an external nipple of the cannister detachably connected to a coupling of the frame through which the radwaste effluent is received. One end of an elongate tool and an upper end of the cannister have interconnectable cooperating means for remotely removing and replacing cannisters on the frame. The check valved inlet chamber prevents escape of radwaste from the filter inlet chamber during and after removal of a cannister from the frame.

15 Claims, 4 Drawing Sheets

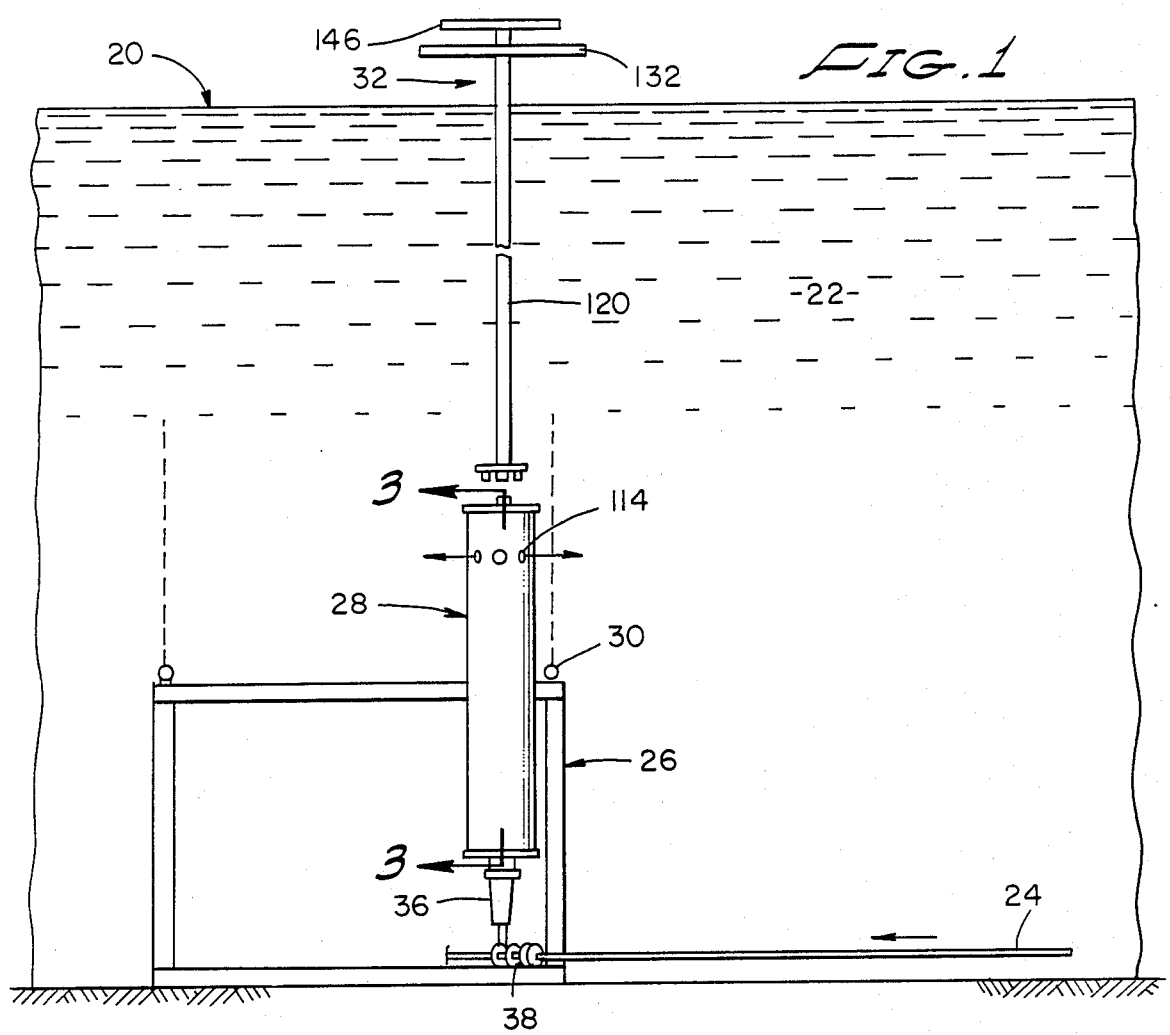
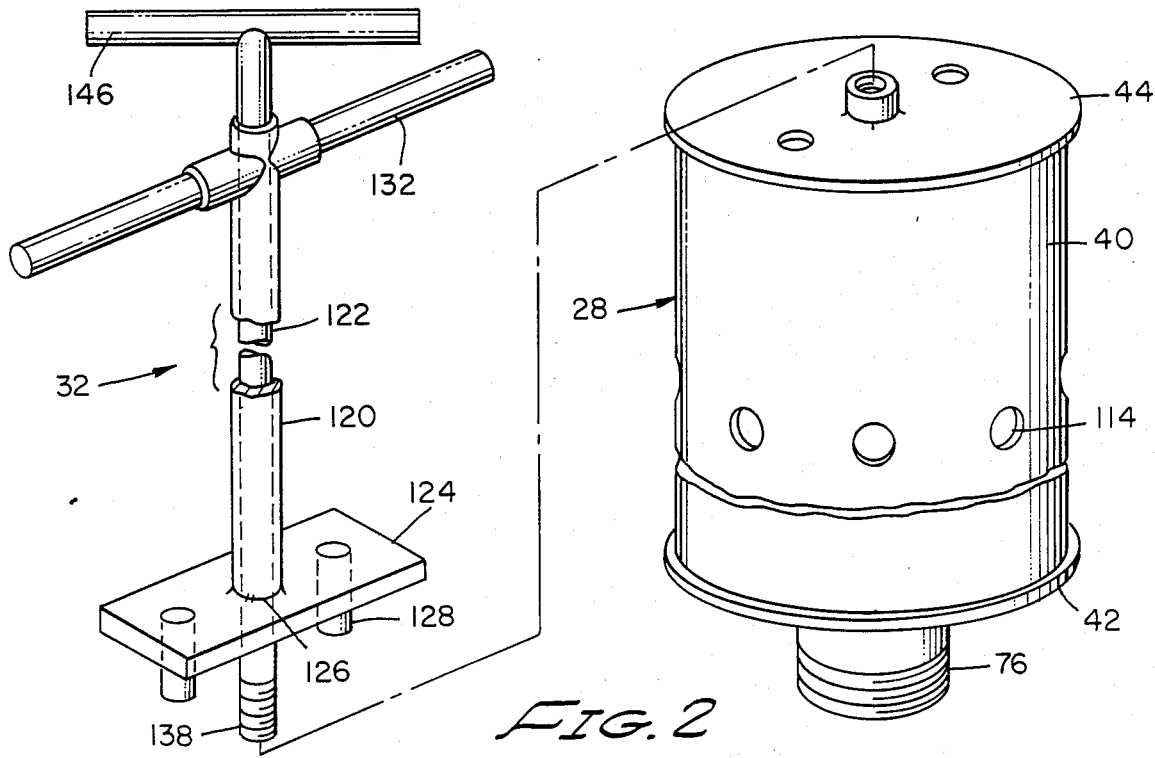

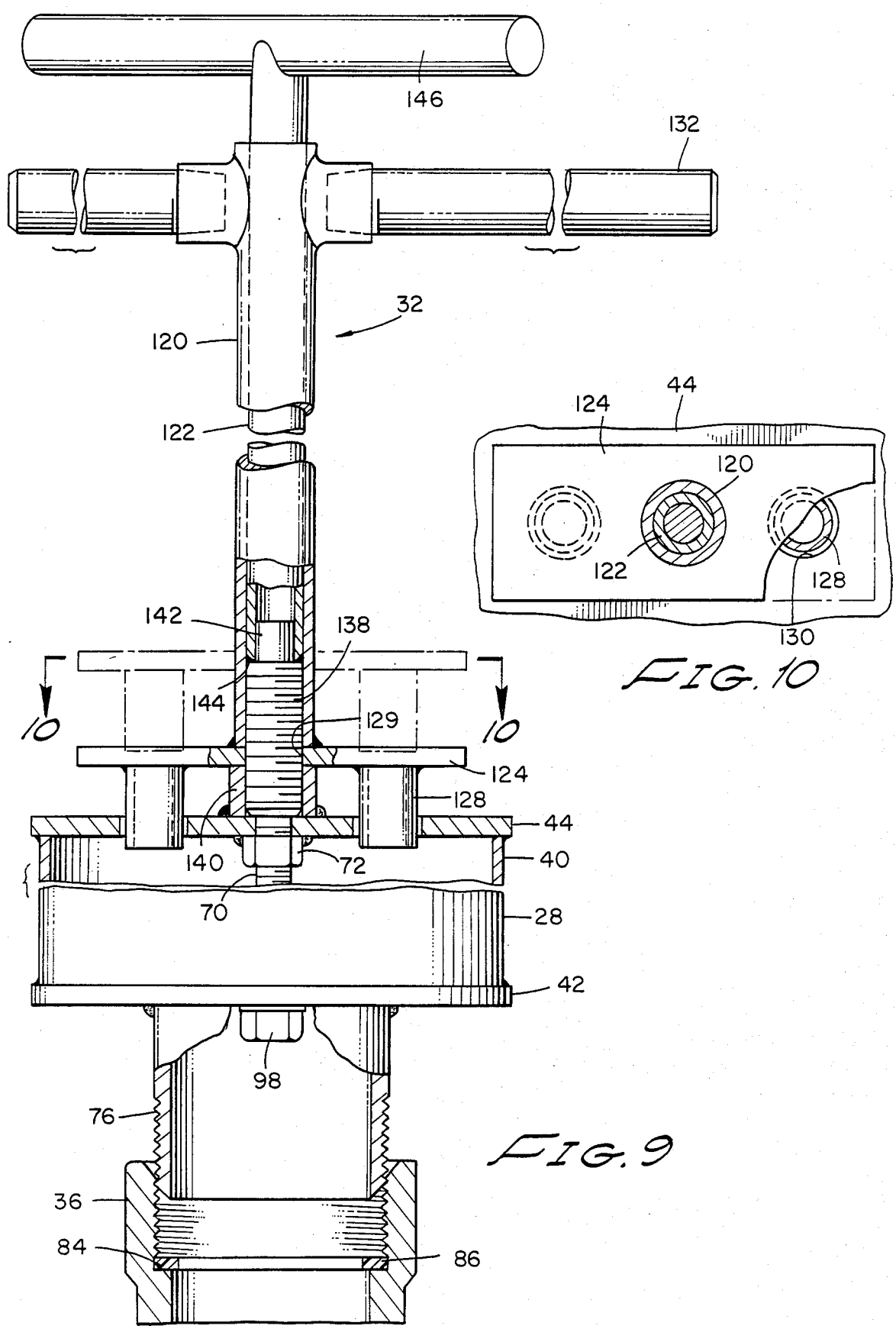

UNDERWATER FILTER SYSTEM

BACKGROUND OF THE INVENTION

The present invention relates generally to filter systems and, more particularly, to a submersible filter system for handling fluids having radioactive contaminants in an underwater environment.

In a nuclear reactor power facility having a pool containing water to serve as a shield against radiation from a source within the pool it is sometimes necessary to conduct operations within the pool which are productive of particulate matter and gases having entrained contaminants. For example, such contaminants may be generated by underwater operation of an electrical discharge machine (EDM). The waste product of the underwater EDM process comprises a stream of pool water with entrained contaminated particulate matter and vented gases which effluent stream must be filtered to eliminate the contaminants before the water of the effluent stream is permitted to re-enter the pool.

Typically, the filtration is performed by a series or bank of relatively small filter cartridges rather than a single and relatively large filter element for the reason that there are dimensional limitations imposed by the structure provided for disposing of the contaminated filter cartridges. More specifically, an underwater tunnel of small cross sectional area leads from the main pool to an underwater adjacent facility in which spent cartridges are deposited within a containment vessel or cask of small cross sectional area which, when filled with a plurality of the spent filter cartridges, is moved to a burial site. When a spent filter cartridge is removed from a filter apparatus within the pool it is sometimes necessary that it be rotated 90° before it can pass through the connecting tunnel and after it has exited the tunnel it is manipulated to an erect position to permit insertion into the waste containment vessel. Since the contaminated dangerously radioactive filter cartridge must be manipulated remotely it is possible that contaminated residue may escape from within the cartridge as it is lifted out of the filter apparatus, tilted to a horizontal position to align its long axis with the tunnel, and then re-adjusted to vertical position. In addition, the filter cartridge itself may be dropped or come into contact with some rigid structure which may break the cartridge or due to impact may dislodge contaminated material from within the cartridge and release it into the pool.

SUMMARY OF THE INVENTION

An objective of this invention is to obviate the foregoing and other disadvantages of prior underwater filter systems and cartridges and of the tools employed to remotely install and remove such cartridges. The invention comprises a skid which supports a plurality of disposable and replaceable filter cannisters in an upright position, preferably in a multiplicity of banks. The skid is fitted with a plurality of upstanding couplings fixedly mounted on the skid and to which the lower ends of the upright filter cannisters are detachably interconnected. Within the shelter of each cannister a filter cartridge is coaxially disposed affixedly mounted between a pair of opposite end plates of the cannister. The bottom plate of the cannister is formed with a circular array of ports in fluid communication with a downwardly projecting nipple by means of which the cannister is interconnected to a coupling of the skid. A check valve is fitted within the lower end of the filter cartridge that is spring biased to a normally closed position from which it is displaced when the pressure of the effluent stream from within the pool in which the apparatus is mounted exceeds the spring resistance. The effluent passes through the filter element into a space defined between the outer surface of the filter cartridge and the inner surface of the cannister, the latter being fitted with a circular array of ports by means of which the clean filtrate is returned to the pool.

The top plate of the filter cannister is adapted for interconnection with an elongate tool comprising a telescopically related pair of tubular members, each of which is fitted with an actuating handle by means of which each of the telescopically related members may be rotated independently of the other. The outer one of these tubes is fitted at its lower end with a spanner mechanism adapted for keying engagement with cooperative detent means or holes in the top plate while the lower end of the inner telescoped element is adapted for threaded interengagement with a nut affixed on the top side of the cover plate. By sequential operation of the two telescopically related members a cannister containing a spent filter element is removed from the skid and a fresh filter element in a new cannister may be substituted.

BRIEF DESCRIPTION OF THE DRAWINGS

FIG. 1 is a schematic, partial elevational view of a reactor pool containing an underwater filter system of the invention.

FIG. 2 is an exploded perspective view of the filter cannister and removal tool components of the invention.

FIG. 9 is a view similar to FIG. 3 but showing in solid and phantom outlines different positions of the removal tool relative to the filter cannister.

FIG. 10 is a view taken on the line 10—10 of FIG. 9.

DESCRIPTION OF THE PREFERRED EMBODIMENT

Figure 3:
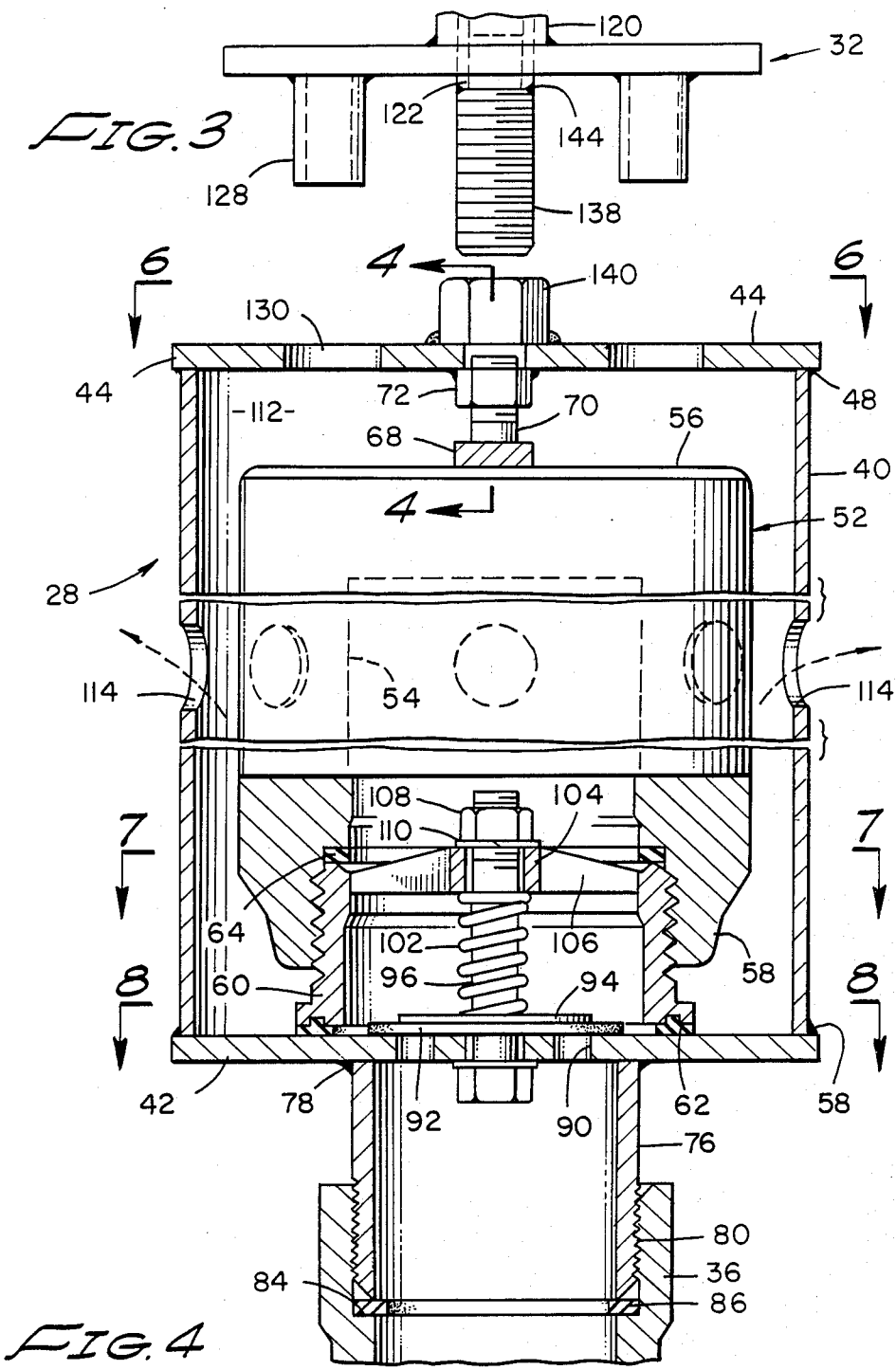
FIG. 3 is an axial sectional view on the line 3—3 of FIG. 1 showing the filter cannister in an installed position and the lower end of the removal tool in axial alignment therewith but in uncoupled relation relative to the cannister.
Figure 4:
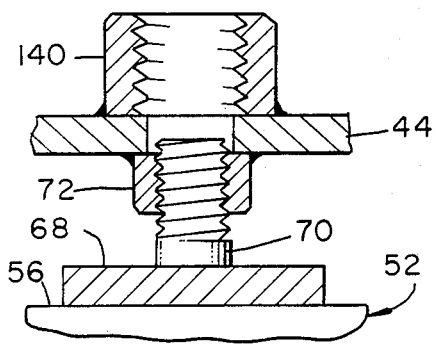
FIG. 4 is a vertical fragmentary sectional view taken on the line 4—4 of FIG. 3.

Referring to FIG. 1, a pool structure designated generally at 20 is filled with water 22 as a shield against radiation from a source contained within the pool. Typically, all operations which are to be conducted within the pool 22 must be performed remotely from outside and above the pool 22 and such operations may frequently be productive of particulate or gaseous matter which becomes radioactive upon exposure to the radioactive source within the pool. In such cases it is necessary to minimize escape into the pool water of the radioactive waste material (radwaste) as by conducting the radwaste contaminated effluent stream from a machining operation through a submerged conduit 24 to a submerged filter or bank of filters before the clean filtered effluent is permitted to return to the pool 22. Thus, in the illustrated embodiment of the invention, there is a skid frame 26 mounting an upstanding bank of filter cannisters, each designated generally by the numeral 28, the skid being fitted with lifting lugs 30 for cables by means of which the filter system apparatus may be lowered into and retrieved from the floor of the pool structure 20. A filter cannister removal and replacement tool, designated generally by the numeral 32, is provided for insertion or removal of a filter cannister 28 from a safe remote location above the body of water 22.

More particularly, the skid framework 26 may comprise an open-top boxlike frame adapted to support a plurality of the filter cannisters 28 divided into, for example, two banks each bank comprising a plurality of the cannisters. For each cannister the skid framework 26 is fitted with a fixedly mounted upright coupling 36 whose upstream end is in valve controlled fluid communication with a manifold means 38. The upstream end of the manifold is interconnected in valve controlled fluid communication with the downstream end of the effluent conduit 24. The system may be adapted, for example, to provide continuous operation by utilizing two separate filter nests or banks of the cannisters 28. When the system is in operation one filter nest is isolated and remains clean while the filters of the other nest are onstream. When the filters in the operating nest are expended the clean nest is valved in and the dirty nest valved out so that the filter cannisters of the dirty nest can then be replaced without interrupting process operation.

Each cannister 28 comprises a disposable permanent assembly of parts whose construction is best seen in FIG. 3. Thus, each cannister has a body 40 comprising a length of tubing of circular cross-section that is fitted at its lower end with a bottom plate 42 and fitted at its upper end with a top plate 44. Both plates 42, 44 comprise circular discs of slightly larger diameter than the body 40 to define shoulders such that the two plates may be permanently coaxially affixed, as by welding 48, 50, to opposite ends of the circular body 40.

The bottom plate 42 comprises a base for mounting a schematically indicated filter cartridge 52 within the cannister 28. Several types of known filter cartridge are available for this purpose. They may, for example, comprise a pleated paper filter or a blanketed fiberglass mesh filter. In any event, the filter cartridge 52 is generally cup shaped in configuration having a cylindrical filter element wall portion defining an interior or inlet chamber 54 beneath an imperforate top wall 56. The cartridge includes a suitably reinforced lower end portion 58 that is interiorly tapped to receive a threaded external periphery of a filter adapter sleeve or ring 60 whose lower end is seated on the upper surface of the bottom plate 42. A sealing gasket 62 is interposed between the bottom end of adapter 60 and a similar gasket 64 is seated on a shoulder formed within the lower end 58 of the filter cartridge 52 to define circumferential fluid tight sealing engagement between the parts. The imperforate top wall 56 of the filter cartridge may include an integrally formed strap like area 68 extending diametrally to anchor the root end of an upwardly projecting central screw stud 70 that is receivable within a nut 72 coaxially affixed to the underside of the top plate 44 of the cannister.

A tubular nipple 76 is coaxially affixed to the underside of the bottom plate 42, as by means of a circumferentially continuous bead of welding 78, to define a fluid tight seal. As shown in FIG. 3, the nipple 76 is of substantially the same internal diameter as ring 60 and the chamber 54 within the filter cartridge 52. The lower end of the nipple 76 is provided with tapered external pipe threads 80 for engagement with complementary internal threads of the upstanding coupling 36. As is shown in the figure, an internal annular shoulder 84 is defined within the coupling 36 to seat an annular gasket 86 while the lower edge of the nipple 80 terminates in substantially a knifelike edge to ensure sealing penetration against the gasket 86.

Figure 8:
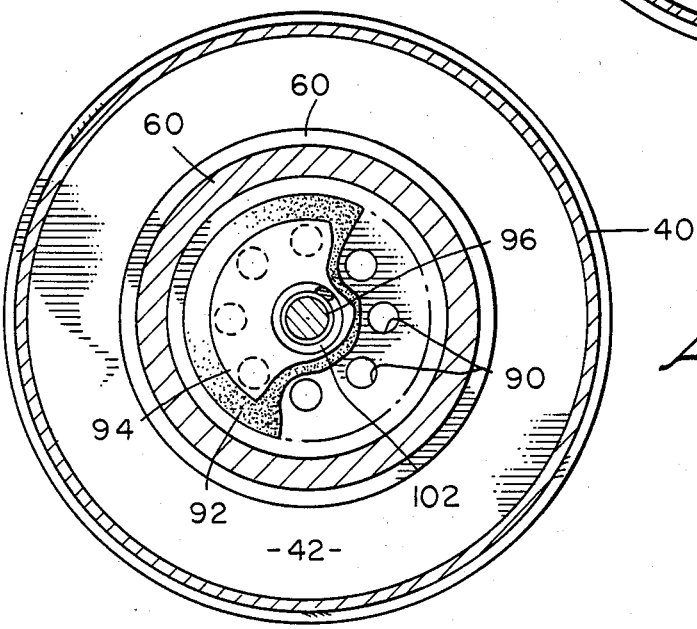
FIG. 8 is a sectional view on the line 8—8 of FIG. 3 with portions cut away.

Referring to FIG. 8, the bottom plate 42 is formed with a circular array of holes 90 within a diameter encompassed by the inner diameter of the nipple 76, adapter 60 and filter cartridge chamber 54 thus providing fluid communication between the interior of the filter cartridge and the source of contaminated fluid inducted through the line 24. Flow through the holes 90 is controlled by means of a check valve comprising an elastomeric disc 92 beneath a metallic disc 94, both of which are concentrically mounted adjacent the lower end of a bolt 96 extending coaxially through the adapter 60 and plate 42. A head 98 of the bolt 96 bears against a washer 100 against the underside of the bottom plate 42. A coil spring 102 around bolt 96 seats on top of metal disc 94. The upper end of the spring is seated against a circular collar 104 defined at the inner ends of a plurality of radially extending spider arms 106 integrally formed with the upper end of the adapter 60.

Figure 5:
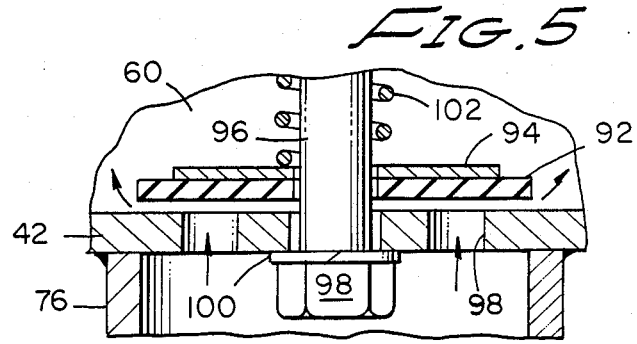
FIG. 5 is partial sectional view, on a larger scale, of the lower end portion of the cannister of FIG. 3 but showing the check valve in an open condition.
Figure 6:
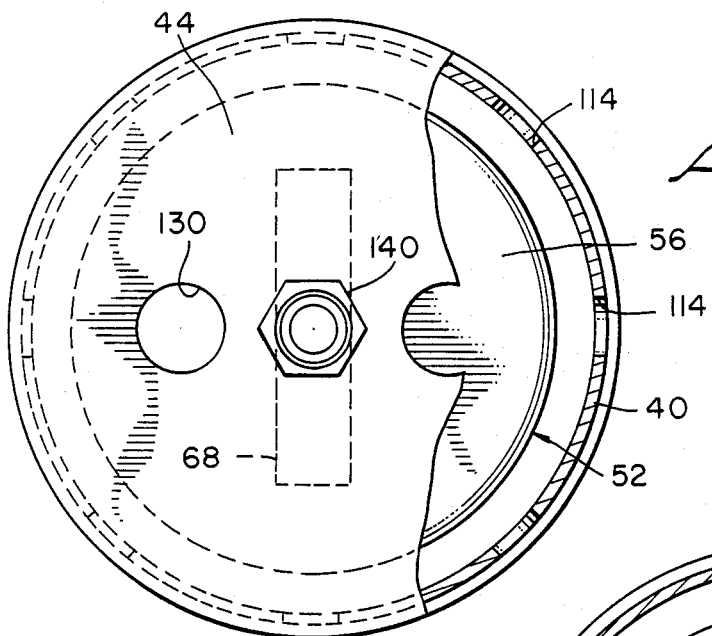
FIG. 6 is a view taken on the line 6—6 of FIG. 3 with a portion cut away to show interior details of construction.
Figure 7:
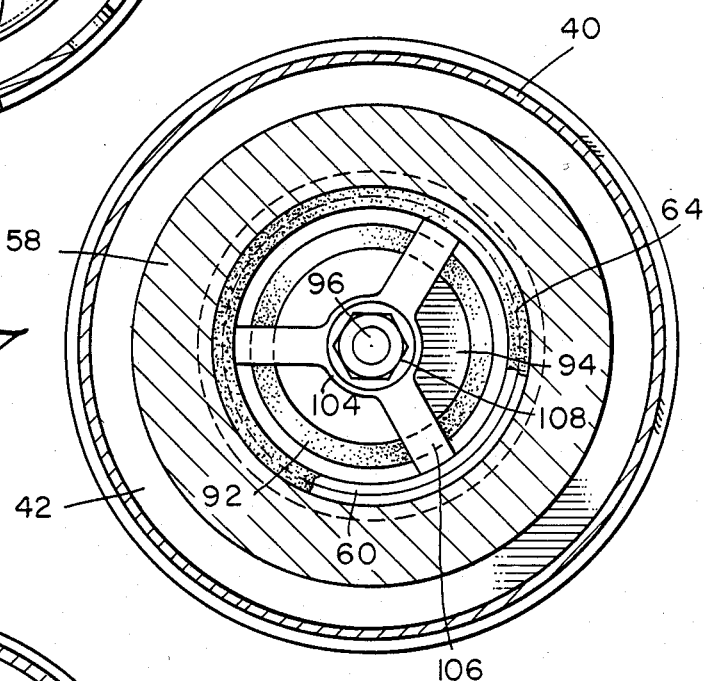
FIG. 7 is sectional view on the line 7—7 of FIG. 3.

The upper end of the bolt 96 extends through the collar 104 to threadedly engage a nut 108, coaxially seated over a lock washer 110. As best seen in FIGS. 5 and 8, the elastomeric disc 92 is of larger diameter than the diameter within which the holes 90 are encompassed so that when insufficient hydraulic pressure is imposed on the underside of the disc the spring 102 forces the disc into closing engagement on the upper surface of the bottom plate 42 over the holes 90.

In the assembly of the cannister 28 the nipple 76 may first be welded to the underside of the bottom plate 42. The adapter ring and check valve assembly is assembled on the top side on the plate 42 and secured in place by appropriate adjustment of the nut 108 and lock washer 110 at the upper end of the bolt 96 followed by assembly of the gasket 64 and filter cartridge 52 onto the adapter ring or sleeve 60. Subsequently, the cylindrical body 40 is welded to the top side of the plate 42. The nut 72 on the underside of the top plate 44 is next threaded onto the stud 70 protruding from the top of the filter cartridge to bring plate 44 into snug engagement with the upper edge of the cylindrical body 40, followed by welding of the top plate to the body 40.

The filter cartridge 52 occupies a major portion of the cross sectional area and axial length of the cannister. As will be evident, the contaminated effluent, when under a pressure sufficient to raise the disc 92 from its seat as indicated in FIG. 5, is inducted from the nipple 76 and enters into the filter element chamber 54. The effluent then flows radially outwardly through the filter element wall into a filtrate chamber 112 defined between the inner surfaces of the cylindrical body 40, bottom plate 42 and top plate 44 and external surfaces of the filter cartridge 52 and adapter 60. The clearance between the inner surface of the body 40 and the outer surface of the cartridge 52 serves not only to define the chamber 112 but also enables the cannister to serve as a shield preventing contact by an external object with the relatively fragile cartridge 52. As is evident from FIG. 1 the clear filtrate expelled out of the cartridge 52 and into the chamber 112 is exhausted from the cannister through a plurality of exhaust ports 114 formed through the body 40 that are preferably equally circularly spaced around its circumference. The clear filtrate is thus returned into the reactor pool 22.

Referring now to FIG. 9, the tool assembly 32 comprises a telescopically related pair of an outer tube 120 and an inner tube 122 that is rotatably and axially slidably moveable with respect to the outer tube. For a typical reactor pool both tubes may be on the order of 16' in length while the inner tube 122 may be slightly longer than the outer tube. At its lower end the outer tube 120 has a diametrically disposed strap 124 rigidly secured thereto, as by welding 126, to support a parallel pair of spanner studs 128 secured to the underside of the strap 124. As is evident from the drawings, the strap 124 is disposed in a plane normal to the axis of the tubes 120, 122 and the spanner studs 128 are equally radially spaced on diametrically opposite sides of and parallel to the axis of the tool. As is best seen in FIG. 9, the strap 124 is formed with a central hole 129 of substantially the same diameter as the inner diameter of the outer tube 120.

The top plate 44 of the cannister assembly is formed with a diametrically opposite pair of holes 130 in coaxial alignment with the spanner studs 128. As shown in FIG. 9, the holes 130 are slightly larger in diameter than the outer diameters of the spanner studs 128 to facilitate penetration of the holes 130 by the studs when the strap 124 is moved from the phantom line position into the solid outline position shown in the figure. At its upper end, the outer tube 120 is fitted with a T handle 132 by means of which the tube 120 may be turned in either direction to correspondingly turn the cannister assembly 128.

At its lower end the inner tube 122 is fitted with a threaded rod 138 adapted for threaded engagement with a nut 140 coaxially welded to the center of the top surface of the top plate 44. Preferably, the threaded rod 138 at its upper end has a cylindrical shank portion 142 telescopically received within the lower end of the tube 122. The shank 142 defines a shoulder by means of which the two parts can be permanently joined by means of a weld 144. The upper end of the inner tube 122 protrudes above the upper end of the outer tube 120 and is fitted with a T handle 146.

In order to remove a filter cannister 28 from its threaded connection with a coupling 36, the tool 32 is manipulated from above the body of water 22 to align and then couple the two spanner studs 128 with the holes 130 of the top plate 44 of the cannister assembly, as indicated in solid outline in FIG. 9. This serves to bring the threads of the rod 138 into alignment with the threads of the nut 140 on the top of the cannister assembly so that upon clockwise rotation of the handle 146 of the inner tube 122 until the rod 138 bottoms out on the upper surface of the plate 44 the two parts are firmly joined. Thereafter, the entire filter cannister assembly 28 is rotated counterclockwise using the T handle 132 of the outer tube 120 until the nipple 76 is disengaged from the coupling 36. Thereupon, the filter cannister can be lifted out of the skid framework 26 by bodily raising the tool 32.

In order to install a clean filter cannister the new cannister is first connected to the tool 32 in the manner described above. Thereafter, the tool 32 with the cannister thereon is lowered into place through guides (not shown) on the skid and onto its coupling 36 care being taken to avoid damaging the threads of the nipple 36. The cannister is then threaded into its coupling by rotating the T handle 132 of the outer tube 120 in a clockwise direction. The tool is then removed from the installed cannister by reversing the tool connection procedure outlined above.

Referring to FIG. 1, let it be assumed that a machining operation (not shown) is taking place such that the upstream end of line 24 is inducting, under pressure, an effluent stream consisting of water from the pool 22 having entrained radwaste contaminated particulate matter and/or gases. Accordingly, the valve disc 92 is forced to the open condition illustrated in FIG. 5 against the resistance of the spring 102 and the effluent enters the filter cartridge chamber 54 to pass through the filter element sidewall of the cartridge. As the filter element sidewall of the cartridge 52 loads up, the system's operating conditions of flow and pressure will change and is periodically monitored to ensure that adequate line velocities are maintained to preclude settling of particulate. When the filter cannister differential pressure exceeds a predetermined limit, the coupling 36 to which the cannister is connected is valved shut, as is the manifold 38 to which it is connected. The spring 102 of the check valve mechanism forces the valve disc 92 to the fully closed position illustrated in FIG. 3 and the valve remains securely closed during uncoupling of the cannister from its coupling and all subsequent handling of the cannister for disposal purposes. As a result, none of the contaminated material contained within the filter cartridge 52 can escape. At the same time, due the presence of the cannister surrounding the cartridge, the cartridge will not be damaged and dirt will not escape should it be dropped during subsequent handling or if the cannister comes into contact with some object.

While the invention has been explained in detail, it is to be understood that the invention is not limited in its application to the details of construction and the arrangements of the components set forth in the description or illustrated in the drawings. The invention is capable of other embodiments and of being practiced and carried out in various ways. Also, it is to be understood that the phraseology and terminology employed herein is for the purposes of description and should not be regarded as limiting.

We claim:

1. A submersible filter system for immersion in a pool, said system, comprising:
    a frame means;
    a fluid coupling means affixed to said frame means in an upstanding position, said coupling means comprising the downstream end of a conduit for conducting an effluent fluid under pressure to said coupling means;
    a hollow cannister having a bottom nipple means for releasably connecting said nipple means to said coupling means to establish fluid communication therebetween and to fixedly support said cannister in an upright position on said coupling means of said frame means;

said cannister having a first fluid passage means in alignment with said nipple means for inducting the effluent fluid from said nipple means into said hollow cannister;

a filter means;

mounting means for fixedly mounting said filter means within and in spaced apart relation to said cannister, said mounting means and said filter means being adapted to divide the interior of said cannister into an inlet chamber and a filtrate chamber;

said cannister having a second fluid passage means for exhausting filtrate fluid directly from said filtrate chamber into the pool;

a check valve means mounted in operative association with said first fluid passage means, said check valve means being responsive to the presence or absence of effluent fluid under pressure in the conduit for admitting effluent fluid into said inlet chamber and for preventing backflow of effluent fluid from said inlet chamber to said nipple means, whereby when said cannister and said nipple means are uncoupled from said coupling means in the absence of effluent fluid under pressure in the conduit, effluent fluid is confined within said inlet chamber; and an elongate tool means having cooperating means and adapted at one end for releasable interconnection at a top of said cannister to effect uncoupling of said cannister and nipple means from said coupling means when said tool means is operated at its other end.

2. A filter system as in claim 1 wherein:

said filter means comprises a substantially cylindrical cartridge having an imperforate top wall over a substantially cylindrical filter element sidewall surrounding said inlet chamber; and said mounting means comprises a substantially cylindrical element engaged with a lower end of said cartridge.

3. A filter system as in claim 2 wherein said check valve means is positioned within said cylindrical element.

4. A filter system as in claim 3 wherein:

said inlet chamber and said substantially cylindrical element are positioned in alignment with said first fluid passage means and said nipple means;

said cylindrical element being adapted to at least partially support said valve means in operative association with said first fluid passage means.

5. A filter system as in claim 1 wherein:

said mounting means and said filter means include means to divide the interior of said cannister into an inlet chamber that is substantially surrounded by said filtrate chamber whereby said cannister serves as a shield against contact between said filter means and an object external to said cannister before, during and after uncoupling of said cannister and nipple means from said coupling means.

6. A filter system as in claim 1 wherein said cooperating means are adapted to uncouple said nipple means from said coupling means by rotary and axial movement.

7. A filter system as in claim 1 wherein said nipple means and said coupling means are threadedly engaged.

8. A filter system as in claim 1 wherein:

said cooperating means comprise a spanner wrench means and a threaded nut and threaded rod means centered on said upper end of said cannister, said spanner wrench means being of larger radius than said threaded nut and threaded rod means.

9. A filter system as in claim 8 wherein:

elongate tool means comprises an outer tube and an inner member that is rotatably and axially slidably seated within said outer tube, said outer tube bearing a portion of said spanner wrench means and said inner member bearing a portion of said threaded nut and threaded rod means.

10. A filter cannister assembly for unitary mounting or retrieval from a submersible filter system, said assembly comprising:

a hollow cannister externally rigidly mounting a nipple means on a first side thereof;

said cannister having a first fluid passage means in alignment with said nipple means for inducting a fluid from said nipple means into said hollow cannister;

a filter means;

mounting means for fixedly mounting said filter means within and in spaced apart relation to said cannister, said mounting means and said filter means jointly comprising means to divide the interior of said cannister into an inlet chamber and a filtrate chamber;

said cannister having a second fluid passage means for exhausting fluid directly from said filtrate chamber to the exterior of said cannister;

a fluid pressure responsive check valve means mounted within said cannister in operative association with said first fluid passage means, said check valve means having a first operating position in the presence of fluid under pressure in said first passage means and said nipple means for admitting fluid into said inlet chamber and having a second operating position in the absence of fluid under pressure in said first passage means for preventing backflow of fluid from said inlet chamber to said first fluid passage means; and a tool connector means mounted on a second side of said cannister that is opposite from said first side of said cannister, said tool connector means being in operative alignment with said nipple means for releasable interconnection to an external tool for remote mounting or retrieval of said filter cannister assembly on or from a submersed filter system.

11. A filter cannister assembly as in claim 10 wherein:

said filter means comprises a substantially cylindrical cartridge having a top wall over a substantially cylindrical filter element side wall surrounding said inlet chamber; and said mounting means comprises a substantially cylindrical element engaged with a lower end of said cartridge.

12. A filter cannister assembly as in claim 11 wherein said check valve means is positioned within said cylindrical element of said mounting means.

13. A filter cannister assembly as in claim 12 wherein:

said filter cartridge and said substantially cylindrical element of said mounting means are positioned in alignment with said first fluid passage means and said nipple means.

14. A filter cannister assembly as in claim 13 wherein:

said mounting means and said filter means include means to divide the interior of said cannister into an inlet chamber that is substantially surrounded by said filtrate chamber whereby said cannister serves as a shield against contact between said filter means and an object external to said cannister before, during and after retrieval of said filter cannister assembly from a submerged filter system.

15. A filter cannister assembly as in claim 14 wherein:
said cannister comprises a cylindrical body permanently fitted at opposite ends with a circular bottom plate and a circular top plate,
said body having an internal diameter that is larger than the external diameter of said filter cartridge whereby said filtrate chamber comprises a substantially annular space between said body and said cartridge;
said cylindrical element and said check valve means comprising a sub-assembly that is affixed in place on said bottom plate;
said top wall of said filter cartridge and said top plate being rigidly interconnected in spaced apart relationship to stabilize said cartridge with respect to said cannister.

* * * * *